(12) United States Patent
Arellanez, Jr.

(10) Patent No.: US 9,103,140 B2
(45) Date of Patent: Aug. 11, 2015

(54) MOTORCYCLE KEY IGNITION SWITCH COVER

(71) Applicant: Richard Arellanez, Jr., Lawton, OK (US)

(72) Inventor: Richard Arellanez, Jr., Lawton, OK (US)

( * ) Notice: Subject to any disclaimer, the term of this patent is extended or adjusted under 35 U.S.C. 154(b) by 0 days.

(21) Appl. No.: 14/299,055

(22) Filed: Jun. 9, 2014

(65) Prior Publication Data

US 2014/0360848 A1 Dec. 11, 2014

Related U.S. Application Data

(60) Provisional application No. 61/833,246, filed on Jun. 10, 2013.

(51) Int. Cl.
*E05B 17/14* (2006.01)

(52) U.S. Cl.
CPC ....................... *E05B 17/14* (2013.01)

(58) Field of Classification Search
CPC ........ E05B 17/14; E05B 17/142; E05B 17/18
USPC ........... 70/252, 408, 423–428, 455, 429, 430, 70/DIG. 43, DIG. 56, DIG. 81; D8/346–348, 350, 352; D12/126; 200/43.03, 43.22, 302.1, 333; 439/125, 439/135, 892, 893
See application file for complete search history.

(56) References Cited

U.S. PATENT DOCUMENTS

| | | | | |
|---|---|---|---|---|
| 1,464,854 A | * | 8/1923 | Rose | 70/237 |
| 2,942,452 A | * | 6/1960 | Marchese | 70/454 |
| 3,765,199 A | * | 10/1973 | Wiczer | 70/423 |
| 3,797,286 A | * | 3/1974 | Saporito | 70/169 |
| 4,023,388 A | * | 5/1977 | Morvai | 70/455 |
| 4,154,072 A | * | 5/1979 | Flaschar | 70/455 |
| 4,428,211 A | * | 1/1984 | Hermann | 70/34 |
| D282,161 S | | 1/1986 | Barrows | |
| D290,245 S | | 6/1987 | Opitz | |
| 4,676,084 A | * | 6/1987 | Signorelli | 70/440 |
| 4,858,454 A | * | 8/1989 | McAnulty, III | 70/455 |
| 5,063,765 A | * | 11/1991 | Squire et al. | 70/417 |
| 5,180,029 A | * | 1/1993 | Rosenlund | 180/287 |
| 5,241,846 A | * | 9/1993 | Hoke | 70/455 |
| 5,252,791 A | | 10/1993 | Williams | |
| D376,131 S | | 12/1996 | Myers | |
| 5,600,980 A | * | 2/1997 | Fabian | 70/408 |
| 5,623,844 A | * | 4/1997 | Draeger | 70/408 |
| 5,680,095 A | * | 10/1997 | Nassouri | 340/426.28 |
| 5,746,078 A | * | 5/1998 | Kiernan | 70/424 |
| 5,756,947 A | | 5/1998 | Trimble | |

(Continued)

*Primary Examiner* — Lloyd Gall

(74) *Attorney, Agent, or Firm* — Daniel Boudwin; Global Intellectual Property Agency LLC

(57) ABSTRACT

Disclosed is an ornamental ignition switch cover for a motorcycle that provides a decorative and functional appearance while concealing the underlying ignition switch, ignition key, or the keyhole. The device takes the form of a knob or a lever made from metal or other suitable material. The knob portion includes a hollow cavity that provides coverage for the underlying ignition key or the keyhole. The knob portion connects to the ignition switch by an attachment mechanism, such as screws or magnets, which are provided on the knob portion or are provided about the ignition switch perimeter. In this way, the device provides an ignition cover with an outward look of a firearm cylinder or other personalized cover while concealing the presence of the ignition key or the keyhole. The device rotates clockwise or counterclockwise so that it may be locked and unlocked.

16 Claims, 3 Drawing Sheets

(56) References Cited

U.S. PATENT DOCUMENTS

| | | | |
|---|---|---|---|
| 5,761,934 A * | 6/1998 | Kuo | 70/49 |
| 6,305,814 B1 | 10/2001 | Giamas | |
| 7,146,834 B2 * | 12/2006 | Bull et al. | 70/454 |
| 2005/0081580 A1 * | 4/2005 | Nakai et al. | 70/186 |
| 2007/0056340 A1 * | 3/2007 | Boyd | 70/408 |
| 2010/0326149 A1 * | 12/2010 | Chang et al. | 70/423 |

* cited by examiner

MOTORCYCLE KEY IGNITION SWITCH COVER

CROSS REFERENCE TO RELATED APPLICATION

This application claims the benefit of U.S. Provisional Application No. 61/833,246 filed on Jun. 10, 2013. The above identified patent application is herein incorporated by reference in its entirety to provide continuity of disclosure.

BACKGROUND OF THE INVENTION

1. Field of the Invention

The present invention relates to a combination ornamental accessory and a cover for an ignition switch. More specifically, the present invention describes a decorative covering for an exposed ignition switch on motored vehicles, and in a preferred embodiment, a covering for a motorcycle ignition switch that has the outer appearance of a firearm cylinder that may include a plurality of cartridges therein.

An ignition switch on most motorcycles is exposed along its exterior surface. However, it is recognized that exposed ignition switches are not always desired or ideal in all settings. For instance, ignition switches are often destroyed in the process of vandalism or theft as a result of attempted hotwiring. When the motorcycles are recovered, replacing or repairing the ignition switch may be costly or impractical.

Additionally, constant exposure to dirt and debris or moisture may cause the ignition switch to malfunction. For instance, the ignition switch or the keyhole can become clogged with debris. Removing debris may require a user to remove the entire ignition assembly to clean the parts therein, inconveniencing the user. Alternatively, moisture from precipitation can enter the keyhole and rust the lock, causing keys to become damaged or stuck in the ignition switch, preventing the ignition switch from turning. Resulting damage to the ignition switch can prevent the starter motor from receiving power, which makes the motorcycle inoperable. This could be especially problematic as a user can become stranded without an alternative mode of transportation.

In the past, ignition switch covers have been used for the purpose of covering a keyhole on the ignition switch. Unfortunately, prior ignition switch cover devices are not decorative, limiting a user from personalizing the appearance of his or her motorcycle. The ignition switch covers are also not adapted to be easily detached from the ignition switch for the user to access the ignition switch or the keyhole thereon. As a result, the ignition switch covers often interfere with the usage of the ignition switch. Thus, prior ignition switch covers require the user to access the ignition switch by manipulating the cover in order to operate the motorcycle.

The present invention provides an external cover for an ignition switch, preferably an exposed ignition switch for a motorcycle, wherein the cover conceals the ignition switch from view and provides an outward appearance of a firearm cylinder. In a preferred embodiment, the device comprises an annular base member disposed under the ignition switch, which is adapted to receive the ignition switch cover thereon, wherein the ignition switch is that of a firearm cylinder with multiple cartridge chambers having one or more cartridges therein. Fasteners or magnets about the lower periphery of the cylinder provide a means to secure the ignition switch cover to the ignition switch, providing a motorcyclist with an ignition switch cover styled as a firearm cylinder rather than an exposed ignition switch or a keyhole. Several embodiments are disclosed for the purpose of attaching the cover to the ignition switch.

Use of the present invention allows a user to operate a motorcycle without unsightly ignition switches or ignition keys. Installation of the present invention may be in any place where an ignition switch is located, allowing for easy concealment with the decorative ignition switch cover of the present invention. Further, the present invention secures the ignition key in place and protects the ignition switch cover from exposure to dirt, debris, and moisture. The present invention is ideal for use on motorcycles and other motor vehicles.

2. Description of Prior Art

Devices have been disclosed in the prior art that relate to ignition switch covers or assemblies for motorcycles that include an ignition keyhole. These include devices that have been patented and published in patent application publications. Some of these patents describe an ornamental design for a motorcycle ignition switch cover, wherein the cover encompasses a unique shape for an ignition key cover. Another patent discloses an ignition switch that includes a housing, a cover, and multiple electrical terminals. These devices, however, do not disclose a rotatable ignition switch cover that is adapted to rotate clockwise or counter clockwise to lock and unlock. The prior art also fails to disclose a rotatable ignition switch cover that resembles a firearm cylinder that may include one or more cartridges. The following is a list of devices deemed most relevant to the present disclosure, which are herein described for the purposes of highlighting and differentiating the unique aspects of the present invention, and further highlighting the drawbacks existing in the prior art.

These prior art devices have several known drawbacks. For example, U.S. Pat. No. 5,252,791 to Williams describes key-actuated rotary switches adapted to control the ignition circuits of motorized equipment. The Williams device includes a disc-shaped switch contact positioned relative to a number of stationary terminals. The switch contact includes one or more cutouts which isolate individual stationary terminals in different angular orientations of the contact. The signals conducted through each terminal vary as different combinations are bridged by the contact in different orientations. Each terminal consists of a prong, a head extending perpendicularly from the prong, and a dome rising from the head to define a point for engagement with the switch contact.

Similarly, U.S. Pat. No. 5,756,947 to Trimble describes an ignition switch comprising a housing defining an interior region, a cover affixed to an open back end of the housing and supporting a plurality of electrical terminals. Each terminal includes an end portion extending into the housing interior region. The switch also includes a switch assembly supported by the housing, the switch assembly being rotatable about an axis of rotation between at least two positions. Similar to the Williams device, the Trimble device provides no means to protect an opening adapted to receive a key. These devices do not disclose a cover adapted to encase the ignition switch. For instance, Williams discloses that the switch contact is enclosed in a housing, which is turned by means of a shaft having an open end including a keyhole for receiving a key which may be used to turn the shaft and switch contact. The present invention protects the keyhole by means of an ornamental ignition switch cover that is adapted to turn like a key. As such, the present invention provides protection to the exposed end of the ignition switch.

Another device, U.S. Pat. No. 6,305,814 to Giamas describes a keyhole lighting fixture comprising an annular top housing positioned over a bottom housing which is substantially equal in shape and size to the top housing. The top housing includes a printed circuit board and light emitting diode, which is battery powered. The light emitting diode is controlled by an electronic circuit to illuminate a keyhole. While the illumination of the keyhole allows a user to have a better visibility of the keyhole in low light environments, the purpose and design of the Giamas device diverges in intent and design from the present invention, which discloses an ignition switch cover adapted to protect a keyhole disposed on an exterior surface of a motorcycle. The purpose of the present invention is to provide an aesthetically pleasing accessory for a motorcycle while providing protective features to be utilized as desired. It is not desired to facilitate the finding of an ignition switch, but rather to protect the keyhole from becoming damaged while providing an ornamental feature adapted to control the ignition circuits of the motorcycle.

The Giamas device is also limited in the fact that it cannot protect the keyhole. The top and bottom housing is positioned around the keyhole, which does not allow for the ability to cover the exposed surface of the keyhole. Further, the Giamas device cannot illuminate the surrounding area of the keyhole without a power source. This is inconvenient when trying to locate the ignition switch in a low light environment, as the Giamas device provides no other means to locate the keyhole. In contrast, the present invention provides an ignition switch cover that resembles a firearm cylinder, which allows a user to easily identify the ignition switch by vision or touch.

Other examples of prior art are directed to ornamental designs for an ignition switch cover. In particular they are intended to provide a customizable appearance to a motorcycle. U.S. Design Pat. No. D376,131 to Myers is directed to a motorcycle ignition switch and steering lock. The device includes a segmented assembly having joinable ignition body region and a protruding keyhole region. The keyhole is disposed on an exposed end of the device, which is adapted to mount onto a motorcycle.

U.S. Design Pat. No. D282,161 to Barrows discloses an insulated ignition switch cover. The device includes an elongated aperture adapted to receive a key, and two protruding members disposed on either end of the elongated aperture. The two protruding members are connected via a middle rod, wherein each end of the rod is affixed to the protruding members. The keyhole, however, is not adapted to prevent dust, debris, and moisture from damaging the keyhole. Furthermore, Barrows does not disclose an insulated ignition switch cover adapted to revolve around a vertical axis.

Finally, U.S. Design Pat. No. D290,245 to Opitz discloses a motorcycle ignition switch cover. The switch cover comprises a modified cubical housing with a modified disc shaped cover disposed over a keyhole. Opitz, however, does not disclose a motorcycle ignition switch cover that resembles a firearm cylinder. Additionally, Opitz does not disclose a motorcycle ignition switch cover that encases an ignition key and rotate around a vertical axis.

The present invention discloses a cylindrical ignition switch cover that resembles a firearm cylinder having multiple cartridge chambers and one or more cartridges disposed therein. The cylindrical ignition switch cover of the present invention is constructed to connect to an annular base member, wherein the base member is affixed around an ignition switch via a securing pin. When connected, the ignition switch covers ignition switches of various sizes such that it protects the ignition switch, ignition key, or a keyhole disposed on the ignition switch. The cylindrical ignition switch cover is further adapted to unlock or lock in place when it is rotated counter clockwise or clockwise around a vertical axis, respectively. Accordingly, the present invention provides an effective and convenient way to prevent the ignition switch from becoming damaged allowing a user to customize the appearance of his or her motorcycle. It is therefore submitted that the present invention substantially diverges in design elements from the prior art and consequently it is clear that there is a need in the art for an improvement to existing ignition switch cover devices. In this regard the instant invention substantially fulfills these needs.

SUMMARY OF THE INVENTION

In view of the foregoing disadvantages inherent in the known types of ignition switch cover devices now present in the prior art, the present invention provides a new improvement to ignition switch covers wherein the same can be utilized for providing an ornamental accessory for the user while covering and protecting an exposed ignition switch on a motored vehicle.

It is therefore an object of the present invention to provide a new and improved ignition switch cover device that has all of the advantages of the prior art and none of the disadvantages.

It is another object of the present invention to provide an ignition switch cover device that conceals the presence of the ignition switch, ignition key, and a keyhole.

Another object of the present invention is to provide an ignition switch cover device that changes the outer appearance of an exposed ignition switch from one that is purely utilitarian to one that is more decorative and aesthetically pleasing.

Yet another object of the present invention is to provide an ignition switch cover device that transforms an ignition switch into one that resembles a firearm cylinder, wherein the cylinder includes connector means that can be adapted to any ignition switch on a motorcycle or other motored vehicles.

Still another object of the present invention is to provide an ignition switch cover device that provides an aesthetically pleasing accessory for a motorcycle while providing protective features to be utilized as desired.

Still another object of the present invention is to provide an ignition switch cover device that offers improved flexibility with respect to the type of ignition switch being installed onto, increasing the number of applications for the same assembly.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
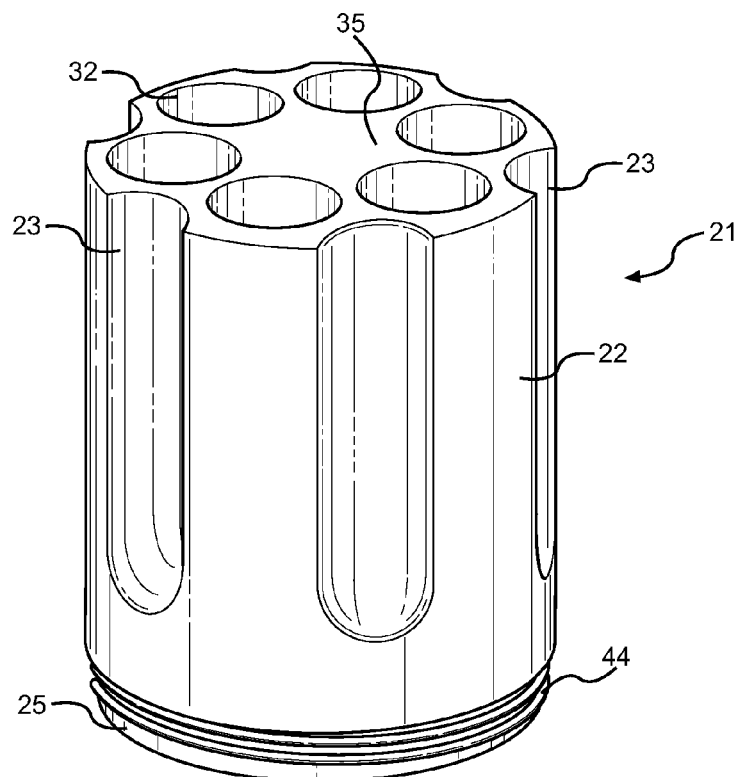
FIG. 1 shows a perspective view of the ignition switch cover portion of the present invention including multiple cartridge chambers disposed along its upper surface.

Reference is made herein to the attached drawings. Like reference numerals are used throughout the drawings to depict like or similar elements of the ignition switch cover. For the purposes of presenting a brief and clear description of the present invention, the preferred embodiment will be discussed as used for covering an exposed ignition switch and providing an ornamental appearance thereto. The figures are intended for representative purposes only and should not be considered to be limiting in any respect.

Figure 2:
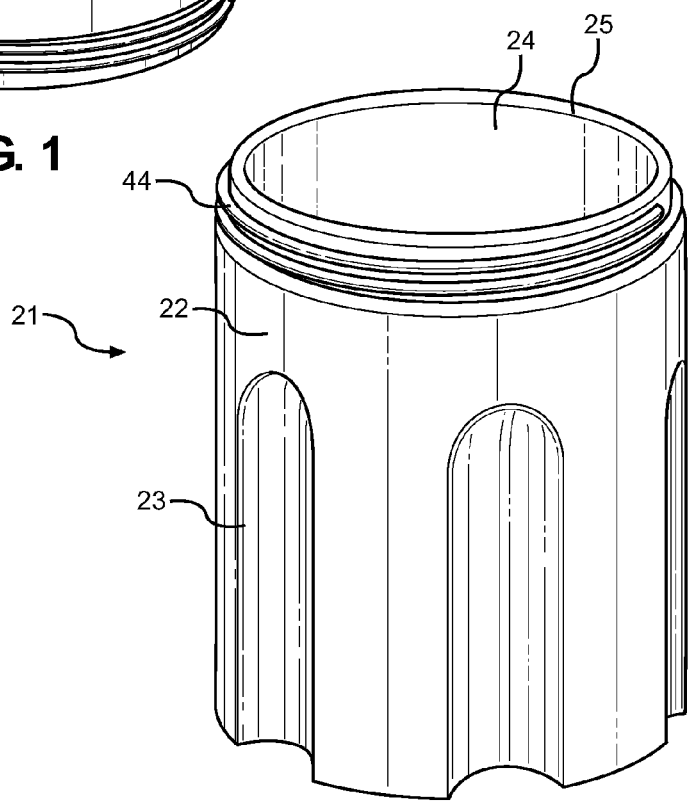
FIG. 2 shows an underside view of the ignition switch cover portion of the present invention that includes a hollow cavity.

Referring now to FIGS. 1 and 2, there are shown perspective views of the ignition switch cover portion of the present invention. It is desired to disclose an ignition switch cover 21 that conceals an ignition switch or a keyhole from view, providing an outward appearance of a decorative accessory. In the illustrated embodiment, the ignition switch cover 21 is constructed to resemble a firearm cylinder. The ignition switch cover device 21 includes a modified cylindrical housing 22 comprising rigid metal or other suitable material. The housing 22 comprises a closed upper surface 35 and a plurality of recessed cartridge chambers 32 thereon. The open lower end, which forms an inner cavity 24 within the housing 22, is adapted to accept an ignition switch and/or an ignition key therein. The housing 22 further comprises connector means along the lower edge 25 of the housing 22. In the illustrated embodiment, the ignition switch cover 21 removably attaches using threading, comprising a threaded lower end 44 near the lower edge 25 of the housing 22.

The lateral surface of the housing 22 may comprise a plurality of elongated indentations 23 for a more accurate depiction of a firearm cylinder. Further, the indentations 23 allow a user to easily grip the housing 22 when rotating the housing 22 during use. In other embodiments, the cartridge chambers 32 may include one or more cartridge-like structures disposed therein, wherein the cartridge-like structures are elongated cylinders adapted to be positioned within the cartridge chambers 32. The cartridge-like structures may be preferably permanently affixed to the chambers 32. In this way, the cartridge-like structures are prevented from falling out of the chambers 32, and thus interfering with the usage of the ignition switch cover 21. The cartridge-like structures may comprise a structure resembling a whole cartridge or a primer end of a cartridge, such that the housing 22 has an appearance of a loaded firearm cylinder when viewed from above.

Figure 3:
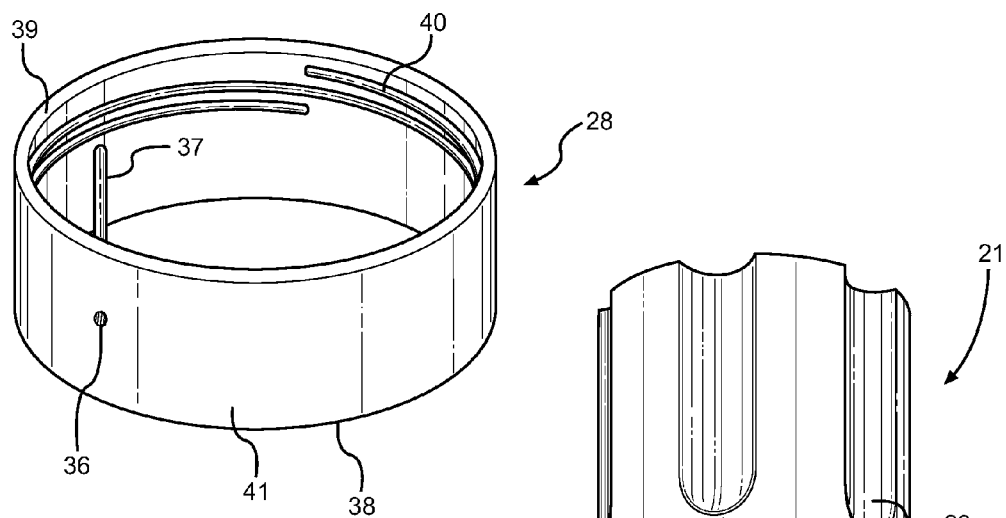
FIG. 3 shows a perspective view of the base member of the present invention that includes an attachment pin.

Referring now to FIG. 3, there is shown a perspective view of the base member 28 of the present invention. The housing of the present invention is adapted to removably connect to a base member 28, which is adapted to secure to an ignition switch. Preferably, the base member 28 is composed of the same material as the housing for a matching appearance. The base member 28 is annular in shape and comprises an upper edge 39, a lower edge 38, an outer surface 41, and an inner surface 40, wherein the inner surface 40 may be threaded to accept the threading disposed on lower edge of the housing. The base member 28 is hollow in the middle, and is constructed to surround the ignition switch disposed on a motorcycle. The base member 28 is secured to the ignition switch via a securing pin 37, wherein the securing pin 37 extends through apertures 36 that are aligned along a chord of the base member 28. The apertures 36 are constructed to snugly fit the securing pin 37 therein. Though it is contemplated that one securing pin 37 may be sufficient in the illustrated embodiment, the base member 28 may comprise multiple securing pins and apertures for added securement to the ignition switch in other embodiments.

Figure 4:
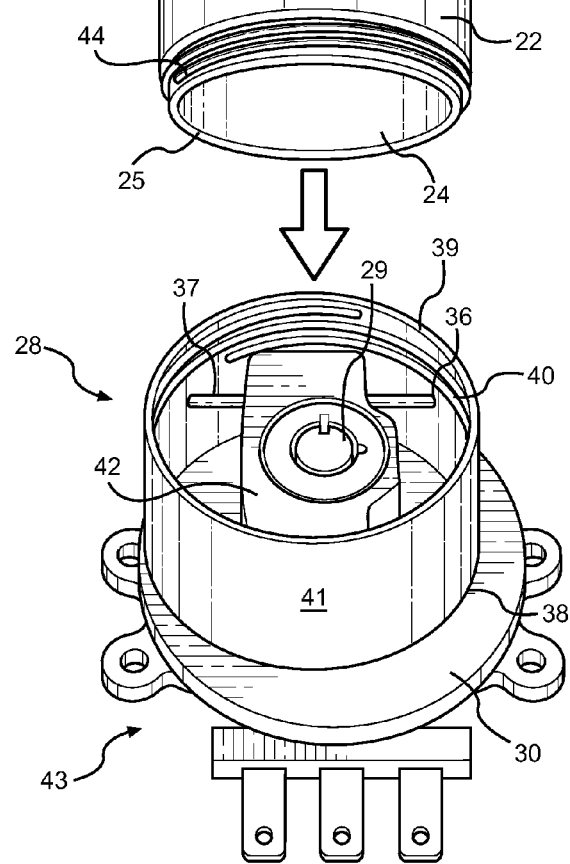
FIG. 4 shows an exploded view of an embodiment of the ignition switch cover device, constructed in accordance with the present invention.

Referring now to FIG. 4, there is shown an exploded view of an embodiment of the ignition switch cover device, constructed in accordance with the present invention. In this embodiment, the housing 22 is adapted to removably attach to the base member 28 via the threaded lower end 44. The base member 28 is installed around the ignition switch 42, which is disposed upon an ignition switch base 30 that may be integral to a motorcycle. Installation of the base member 28 may be in any location where the ignition switch is disposed, allowing easy concealment of the ignition switch 42. The ignition switch base 30 covers the ignition assembly 43 on a motorcycle. The lower edge 38 of the base member 28 rests flushly against the ignition switch base 30 and the upper edge 39 of the base member 28 may be substantially level to or may extend slightly above the ignition switch 42. The base member 28 is positioned such that the apertures 36 on the base member 28 are aligned with apertures on a side of the ignition switch 42. The apertures on a side of the ignition switch may be drilled by the user using conventional drilling or other suitable methods. Once the apertures on the ignition switch 42 and the base member 28 are aligned, a securing pin 37 is threaded therethrough. The securing pin 37 may be secured in the apertures 36 via bore attachment means or the like. In this way, the base member 28 is secured in place around the ignition switch.

The inner surface 40 of the base member 28 includes a threaded element to receive the housing 22 when the housing 22 is aligned with the base member 28, thereby covering the ignition switch 42 and a keyhole 29 disposed thereon. Accordingly, the circumference of the lower edge 25 of the housing 22 is constructed to be substantially equal to the circumference of the base member 28. As the housing 22 is rotated in one direction, the threading 44 tightens the housing 22 to the base member 28 until the outer surface 41 of the base member forms a substantially contiguous surface with the outer surface of the housing 22. In this way, the housing 22 is twistedly fastened to the base member 28 and will not disengage therefrom during high speed activities due to rapid movement of the motorcycle or during periods of high wind even when the motorcycle is stationary. Additionally, the hollow inner cavity 24 of the housing 22 protects the ignition switch 42 and an ignition key placed therein. When the ignition switch cover 21 is no longer needed or when a user needs to access the ignition switch 42, the housing 22 is rotated in the opposite direction to detach from the base member 28.

It is contemplated that a number of different connectors may be utilized for securing the housing to the base member. Accordingly, connecting means of differing types may be substituted as deemed sufficient by one skilled in the art. For instance, the lower edge 25 of the housing 22 may include a plurality of magnets that is adapted to attach to the metallic surface of a motorcycle or the ignition switch base 30 immediately surrounding the ignition switch 42. Accordingly, the ignition switch cover 21 connects at each magnet location along the lower edge 25 of the housing 22. Once affixed, the cover 21 is securely positioned over the ignition switch 28, resisting separation or relative sliding during use. The magnetic connectors provides temporary mounting points for the cover 21, whereafter the cover 21 can be pulled apart when it is no longer desired.

Figure 5:
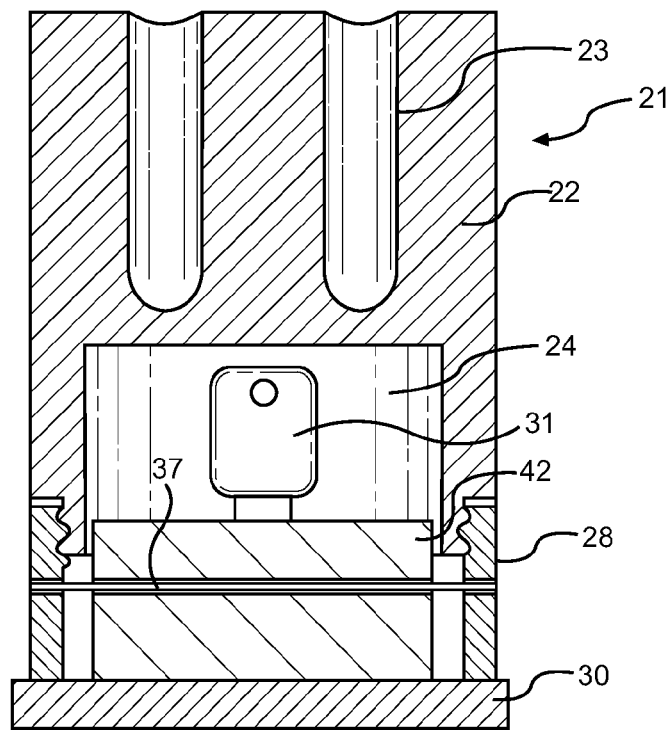
FIG. 5 shows a side cross-sectional view of the present ignition switch cover in a working position over an ignition switch and a key inserted therein.

Referring now to FIG. 5, there is shown a cross-sectional side view of the ignition switch cover 21 of the present invention in a working state, affixed to the base member 28, which is fastened around an ignition switch 42 on a motorcycle via a securing pin 37. The indentations 23 on the housing 22 may provide an aesthetic appearance as well as a functional utility by providing a grip for a user when turning the ignition switch cover 21. As shown, the cover 21 includes a housing 22 having a hollow interior 24 that accepts the ignition switch 42 and an ignition key 31 inserted therein. The lower edge of the housing 22 connects to the inner surface of the base member 28. Connecting the housing 22 to the base member 28 are threaded elements disposed on the lower edge of the housing 22 and on the upper edge of the base member 28. Alternatively, a plurality of magnets may provide securement of the housing 22 to the base member 28, wherein the housing 22 connects at each magnet location along the lower edge of the housing 22. When the ignition switch cover 21 is in operation, it does not affect the intended position of the underlying ignition key 31, and therefore does not inadvertently control the functioning of the ignition key 31. For instance, the ignition key 31 may be placed in a locked position under the housing 22 of the ignition switch cover 21 to prevent a bypasser or the user from inadvertently turning the ignition switch 42 or controlling the ignition.

Figure 6:
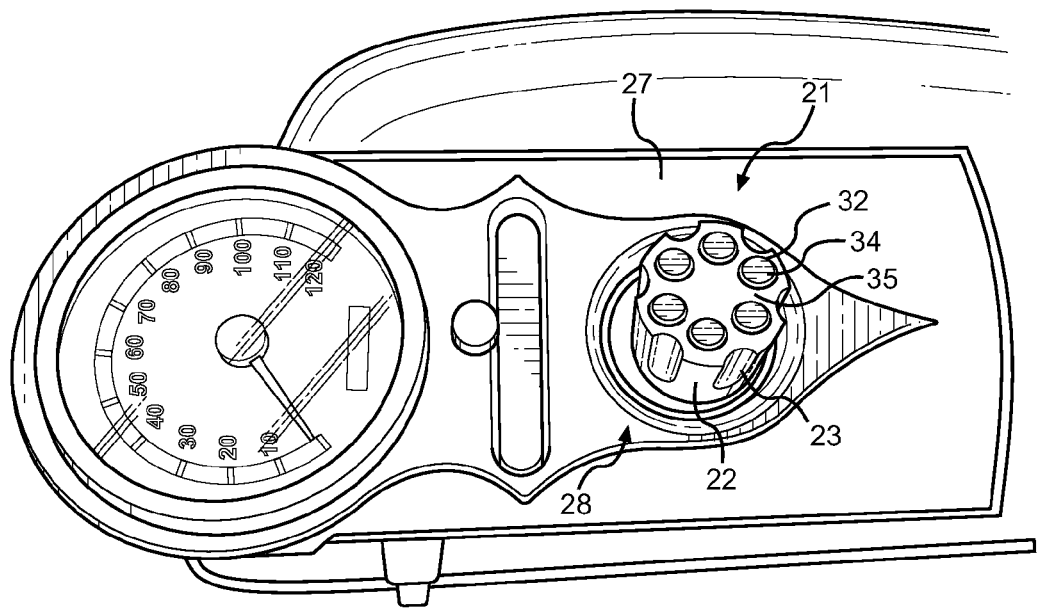
FIG. 6 shows a top view of the present invention in a working position, covering an ignition switch disposed on an external surface of a motorcycle.

Referring now to FIG. 6, there is shown a top view of the present invention in a working state, whereby the ignition switch cover 21 is positioned over an ignition switch, which may include a keyhole on its upper surface. In the illustrated embodiment, the ignition switch cover 21 provides an outward appearance of a firearm cylinder, which includes a housing 22 having several indentations 23 along its lateral surface. The housing 22 also includes an upper surface 35 and six recessed cartridge chambers 32 and several cartridges 34 disposed therein. The base member 28 comprises material that matches the ignition switch cover 21 for an aesthetically pleasing appearance.

Without the ignition switch cover 21 of the present invention, the ignition switch is otherwise exposed on an exterior surface of a motorcycle 27. The housing 22 and the base member 28 are constructed to adapt to a variety of motorcycles and other motored vehicles. As such, the ignition switch cover 21 increases flexibility with respect to its installation procedures and its installed location. Thus, the present invention provides an ornamental ignition switch cover for a motorcycle that is decorative and functional while concealing the underlying ignition key or the keyhole.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A covering for an ignition switch on a motor vehicle, comprising:
    a cylindrical housing member having an upper surface, an open lower end, an outer perimeter defining a shape of said housing member, and a hollow interior adapted to accept an ignition switch therein;
    a base member comprising an annular shape that is adapted to be secured around an ignition switch;
    said housing member open lower end adapted to removably connect to said base member;
    wherein said housing member comprises a firearm cylinder exterior appearance.

2. The covering for an ignition switch of claim 1, wherein said outer perimeter comprise threading near said housing member open lower end.

3. The covering for an ignition switch of claim 2, wherein said base member further comprises an inner surface, said inner surface comprising a threaded element adapted to connect to said housing member open lower end.

4. The covering for an ignition switch of claim 1, wherein said base member is removably connectable to said ignition switch.

5. The covering for an ignition switch of claim 1, wherein said upper surface further comprises a plurality of chambers.

6. The covering for an ignition switch of claim 5, wherein said plurality of chambers further comprises an ornamental cartridge having a cylindrical shape.

7. A covering for an ignition switch on a motor vehicle, comprising:
    a cylindrical housing member having an upper surface, an open lower end, a lateral surface, and a hollow interior adapted to accept an ignition switch therein;
    an annular base member adapted to receive said housing member lower end thereon,
    said base member comprising an inner and outer surface;
    wherein said base member inner surface comprises a threaded element;
    a plurality of apertures aligned along a chord of said base member inner and outer surface;
    an elongated securing pin;
    said plurality of apertures adapted to receive said pin therethrough for removably securing said base member to said ignition switch.

8. The covering for an ignition switch of claim 7, wherein said housing member comprises a firearm cylinder exterior appearance.

9. The covering for an ignition switch of claim 7, wherein said housing member lower end comprises a threaded element adapted to connect to said base member inner surface.

10. The covering for an ignition switch of claim 7, wherein said upper surface further comprises a plurality of chambers.

11. The covering for an ignition switch of claim 10, wherein said plurality of chambers further comprises an ornamental cartridge having a cylindrical shape.

12. A covering for an ignition switch on a motor vehicle, comprising:
    a cylindrical housing member having an upper surface, an open lower end, a lateral surface, and a hollow interior adapted to accept an ignition switch therein;
    wherein said housing member comprises a firearm cylinder exterior appearance;

an annular base member adapted to receive said housing member lower end thereon,
said base member comprising an inner and outer surface;
a plurality of apertures aligned along a chord of said base member inner and outer surface;
an elongated securing pin;
said plurality of apertures adapted to receive said pin therethrough for removably securing said base member to said ignition switch.

13. The covering for an ignition switch of claim 12, wherein said base member inner surface comprises a threaded element.

14. The covering for an ignition switch of claim 13, wherein said housing member lower end comprises a threaded element adapted to connect to said base member inner surface.

15. The covering for an ignition switch of claim 12, wherein said upper surface further comprises a plurality of chambers.

16. The covering for an ignition switch of claim 15, wherein said plurality of chambers further comprises an ornamental cartridge having a cylindrical shape.

\* \* \* \* \*